United States Patent [19]

Barnett

[11] 4,212,126
[45] Jul. 15, 1980

[54] FISHING ROD

[76] Inventor: David L. Barnett, Wyndholme, Back La., Bredon near Twekesbury, Gloucestershire, England

[21] Appl. No.: 943,824

[22] Filed: Sep. 19, 1978

[51] Int. Cl.² .......................................... A01K 87/04
[52] U.S. Cl. ....................................................... 43/24
[58] Field of Search ........................... 43/18 R, 23, 24

[56] References Cited

U.S. PATENT DOCUMENTS

| | | | |
|---|---|---|---|
| 2,777,239 | 1/1957 | Cushman | 43/18 R |
| 3,862,509 | 1/1975 | Petersen | 43/24 X |
| 4,084,343 | 4/1978 | Genovese | 43/24 X |

FOREIGN PATENT DOCUMENTS

| | | | |
|---|---|---|---|
| 2080174 | 11/1971 | France | 43/24 |
| 1526581 | 9/1978 | United Kingdom | 43/24 |

Primary Examiner—James G. Smith
Attorney, Agent, or Firm—Trexler, Wolters, Bushnell & Fosse, Ltd.

[57] ABSTRACT

A fishing rod of hollow tubular construction with a side inlet opening for the fishing line adjacent the handle end and a line exit opening adjacent the tip of the rod. Within the tubular rod are located spaced line guides at intervals which are progressively shorter towards the tip of the rod, the line guides being formed of an anti-friction material and so positioned and constructed that when the fishing rod is bent through about 90° the fishing line will not contact the interior surface of the rod.

15 Claims, 16 Drawing Figures

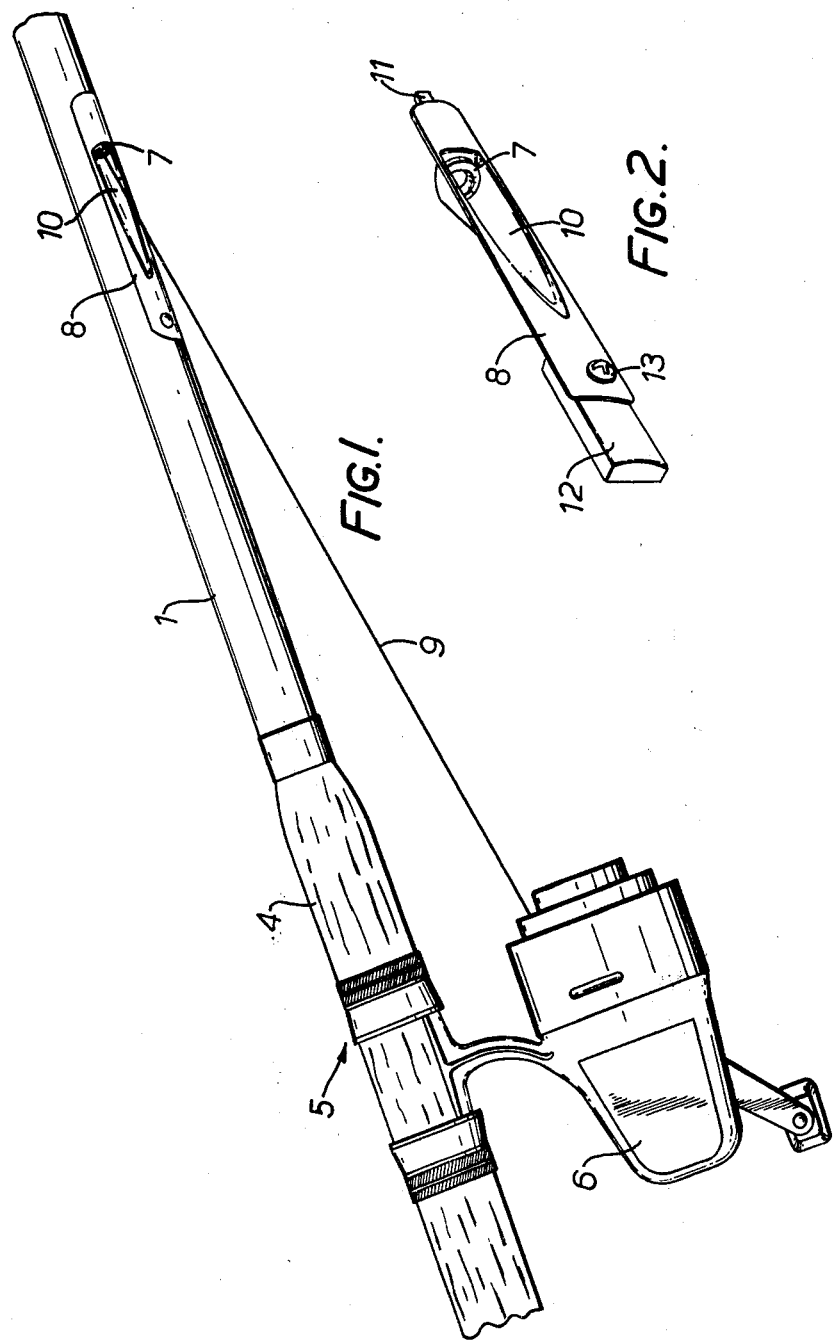

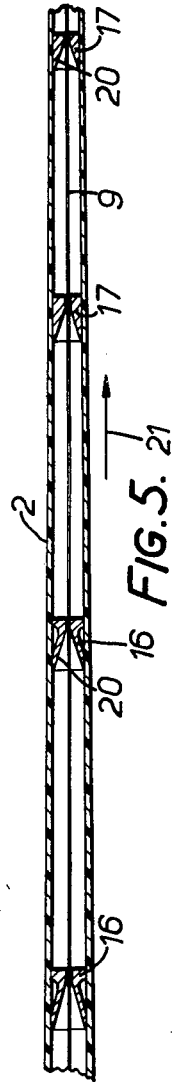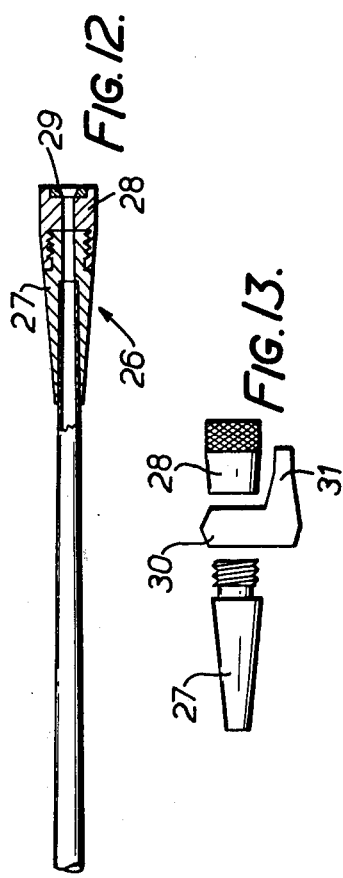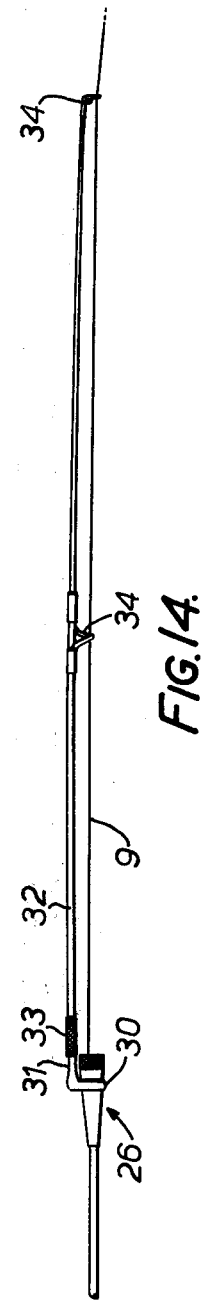

FISHING ROD

BACKGROUND OF THE INVENTION

This invention is concerned with fishing rods. The conventional design of a fishing rod comprises a shaft having a series of line feed eyes whipped on at positions down the length of the shaft, the final eye being situated at the very tip of the rod. Certain problems are met with rods of this type. Thus the sections of the rod have to be accurately located so that the eyes are precisely aligned and then the line has to be fed through each eye independently. In use it is very easy for the line to become tangled around the line feed eyes and the guided line and even experienced fisherman sometimes suffer from this difficulty. Furthermore, in cold weather the eyes can become iced up and all these factors of course cause delays and disruptions.

OBJECT AND SUMMARY OF THE INVENTION

It is an object of this invention to provide a fishing rod which is relatively easy to use and in particular which provides good casting and line retrieval characteristics.

Accordingly this invention provides a fishing rod with a hollow shaft and having a line entry opening to the interior of the shaft at the handle end of the rod and a line exit opening from the interior of the rod at the tip end of the shaft, and wherein a series of line guides are positioned within the shaft so that an internal passageway through each line guide is aligned with the rod axis, and the eyes being positioned along a major proportion of the length of the rod at such spacings that, when the rod is subjected to a test load, being the maximum expected working load when the rod is used for fishing, so as to take up a curved form, the straight line drawn between the points of minimum internal radius of the passageways defined by the wall sections of an adjacent pair of line guides will not contact the curved inner wall of the hollow shaft.

With such an arrangement external eyes are eliminated so that it is no longer possible for the line to become tangled around projections on the rod. Furthermore since the line is now fed through the centre of the rod shaft various advantages are immediately obtained; thus alignment of eyes is no longer a problem when connecting together the sections of the rod and, because the line is fed along the maximum line of force (i.e. the rod centre) during a casting operation, improved casting distances and better line retrieval characteristics can be achieved than with conventional rods using external eyes. The line passage is insulated by the rod shaft so that icing is unlikely except in extreme conditions when fishing would probably be impossible anyway. Initial feeding of the line through the rod is easily achieved by attaching a needle-like line-threader to the end of the line, inserting the line-threader into the line entry opening and making one or two casting movements which will force the line-threader down to the end of the shaft. Another important advantage is that a rod constructed in this manner is relatively easy to manufacture and provides an elegant and streamlined appearance.

It will be appreciated that the external diameters of the eyes become smaller throughout the rod length (to correspond to narrowing of the internal diameter of the rod) at the predetermined points, thus to ensure correct longitudinal fixing of the eyes. If the eyes are to be removable, then ideally the eye length is approximately 1½ times the external diameter, so that the eye will not turn over if it becomes loose within the rod.

The foregoing as well as other objects and features of the present invention will become more apparent upon consideration of the following detailed description when taken in conjunction with the drawings.

BRIEF DESCRIPTION OF THE DRAWINGS

FIG. 1 illustrates the handle portion of a fishing rod constructed in accordance with this invention;

FIGS. 2 to 4 illustrate the line entry opening member for the rod in perspective, cross-sectional and underneath plan views respectively;

FIG. 5 illustrates sections through parts of the rod;

FIG. 12 is a partial cross-section through the terminal portion of the end section of the rod, showing an end cap;

FIG. 13 is an enlarged, exploded view of an end cap of the rod and an adaptor;

FIG. 14 shows a quiver tip device attached to the rod;

DETAILED DESCRIPTION OF THE ILLUSTRATED EMBODIMENT

Figure 3:
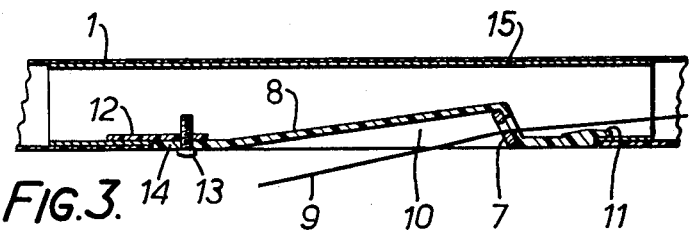

The rod shown partly in FIGS. 1, 5 and 12 of the accompanying drawings comprises a handle section 1, a middle section 2 and an end section 3, the sections being provided with mutually cooperating sleeves enabling the three sections to be connected together. The handle section 1 has a cork handle 4 which provides a mounting at 5 for a fishing reel 6. The handle at the mounting position 5 may be sloped so that the reel axis will lie on a line which is directed down to the axial centre of the rod shaft where a stainless steel eye 7 (FIGS. 2 and 3) is provided within a line entry opening member 8 which receives a line 9 from the reel 6. The opening 10 in the member 8 is of curved cross-section and thus provides a bearing surface for the line 9 as it spirals off the reel 6, to define a conical shape. The member 8 is formed as a moulded cartridge of thermoplastic material (as shown in FIG. 2), which is slotted into a corresponding recess in the rod.

Figure 4:
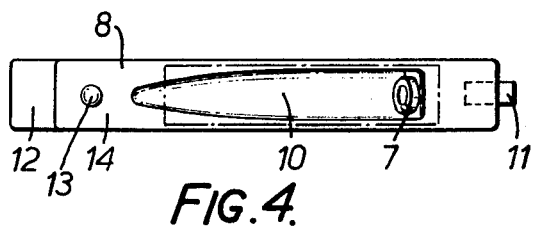

The cartridge 8 (as illustrated in FIGS. 2 to 4) has a nose 11 which locates under the forward edge of the recess in the rod, as shown in FIG. 3, and a locking member 12, fixed by a screw 13, locates under the rearward edge of the recess. The sides of the recess are chamfered to form a seat for correspondingly shaped edges of the cartridge 8, so as to hold the cartridge securely in place, when the screw 13 is tightened, so that it lies flush with the rod surface (see FIG. 3). To remove the cartridge for replacement, the screw is loosened so that the cartridge may be moved rearwardly (with the member 12 sliding inside the rod and the lip 14 sliding outside) until the nose 11 is released. Then the cartridge is slid in the opposite direction to release the member 12.

A sleeve 15 (FIG. 3) of reinforcing material, ideally that of the rod blank sections, is secured within the rod where the opening to receive the member 8 is formed to compensate for the weakening of the rod at that position due to the formation of the opening.

From the eye 7 the line 9 is led through the sections 1, 2 and 3 by a series of eyes 16, 17 (FIG. 5) of progressively smaller diameter owing to the taper of the rod shaft. The eyes may be formed from any convenient material having a low coefficient of friction, such as nylon, thermo-plastics material (e.g. acetal resin) and stainless steel. The eye 16 (FIG. 7) is outwardly tapered to a waist 18, followed by a collar 19, for weight reduction, and to allow the eye to flex to conform to bending of the rod.

Figures 7, 8:
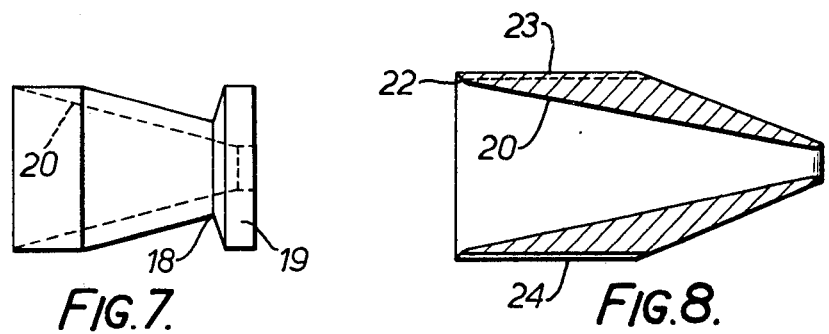
FIG. 7 is an enlarged side view of one type of eye illustrated in FIG. 5.
FIG. 8 is a cross-section through an alternative form of eye to that illustrated in FIG. 6.
Figure 16:
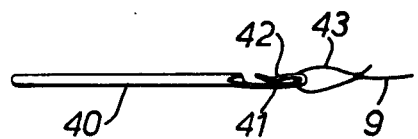
FIG. 16 shows a line-threader used for feeding a line through the rod.

Each of the eyes illustrated in FIGS. 5 to 10 has an internal passageway 20 of frusto-conical shape and the smallest diameter is towards the tip end as indicated by the direction arrow 21 in FIG. 5. Ideally the ends of the passageway are feathered, as illustrated for example at 22 in FIG. 8, to assist in guiding a line threader (FIG. 16). The eye of FIG. 8 is similar to that of FIG. 7 except that the collar 19 is omitted and the non-tapered part 23 is longer. Also a number of drain grooves 24 lead from the outer to inner surface of the eye to allow any accumulating water to drain back into the handle section 1 to be removed through an outlet hole (not shown) which may be provided there.

Figure 9:
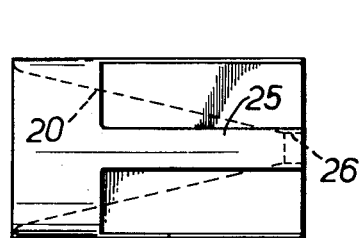
FIGS. 9 and 10 are side and end views respectively of a further form of eye.
Figure 10:
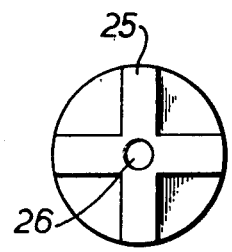

The eye of FIGS. 9 and 10 is of a shape which again is preferred for use near to the butt end of the rod. This has ribs 25 leading in the direction towards the outer opening 26 so that in effect a large amount of material between the ribs 25 is eliminated, so reducing the weight of the eye and thus of the rod.

Figure 11:
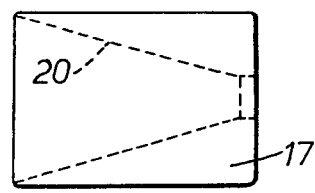
FIG. 11 is a side view of the other type of eye illustrated in FIG. 5.

The eyes 17 (FIG. 11) positioned towards the tip end of the rod cannot readily be reduced in thickness at any point, but since they are small anyway their weight is not too significant.

Generally it is not strictly necessary to shape the eyes, on the outside diameter, to suit the internal taper of the shaft sections 1, 2 and 3, and in fact drainage grooves (such as 24 in FIG. 8) tend to be superfluous as a casting action of the rod will tend to throw any water inside the rod out through the tip.

The eyes 16, 17 provide minimal resistance to the passage of the line therethrough and will be located at predetermined positions along the length of the shaft to ensure that the line, during casting (i.e. whilst it is under some tension), will not touch the internal surface of the shaft which has a relatively high coefficient of friction. The spiralling effect created on the line as it leaves the reel, will tend to be transmitted along the line only to the first eye immediately beyond the line entry member 8. The end section 3 is quite flexible and will bend significantly both during casting and when a fish is pulling on the line and for this reason the eyes situated in this flexible portion should be spaced much more closely together so that they will tend to maintain the line, under tension, out of contact with the inner wall of the shaft which will become curved when the shaft is bent. However it should be realised that allowing the line to touch at one or two points along the length of the rod inner surface, particularly in the terminal portion of the rod leading to the tip, will not seriously impair the operation of the rod.

Figure 6:
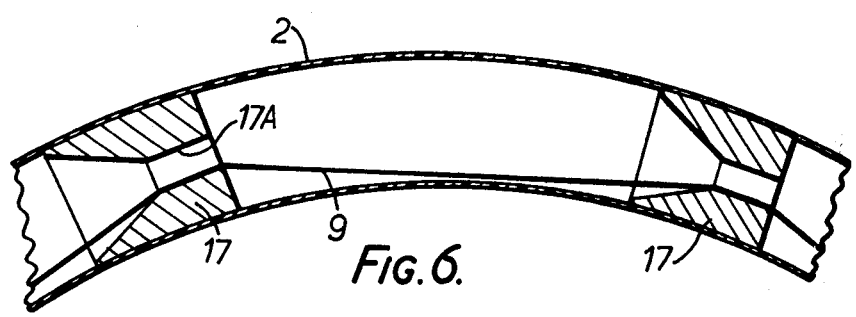
FIG. 6 is a cross-section through a short portion of the rod when under load.

The desired positioning of the eyes is indicated in FIG. 6, where the rod has been bent to the maximum extent expected under working conditions. The points of minimum internal radius of the passageways of two eyes 17, that is the lead out passageway portions 17A determine the maximum distance which may be allowed between the two eyes at this region of the rod shaft to ensure that the line 9 does not touch the interior of the shaft (as shown). As an example, in a 4 meter course fishing rod having a hollow shaft length of 355cm tapering from about 2.4cm to about 0.25cm, 33 eyes will be used. The first eye immediately beyond the entry member 8, and the next seven eyes will be of the type illustrated in FIG. 7 and will have an internal diameter of about 0.32cm, for portion 17A. The next eight eyes will have an internal diameter for portion 17A of about 0.25cm, whilst the last fifteen eyes will have an internal diameter for portion 17A of about 0.20cm. The last twenty-three eyes, and two positioned within joining spigots of the three-section rod will be of the type shown in FIG. 11.

The eyes are readily mounted within the shaft by threading them in sequence into the larger end of the respective shaft sections where they will find their own positions due to the internal taper of the shaft. Dimensional tolerances of the external diameter of the eyes is accurately maintained (to say 0.00125cm) to ensure consistant location of the eyes within the rod blank. Casting action applied to the rod will tend to fix them into the desired positions but if required a contact adhesive could be applied to the outer cylindrical surface of each eye prior to insertion. It is greatly preferred however that the eyes should not be positively fixed, so that they can be pushed out from the opposite end and replaced if they have become significantly worn. The overall length of each eye is 1½ times its external diameter. Then if an eye becomes loose and falls back to the next largest eye, it will not turn over and will be returned to the correct position when a casting action is applied to the rod.

Because of the internal reinforcement sleeve 15 in the region of the line entry opening member 8 it would not be possible to recover any eye between the reinforcement and the tip of the rod section 1. One or more eyes will therefore be fixed in the formation of the rod section 1. Alternatively a special spacer tube could be fixed in section 1, to receive an eye of smaller cross-section which will be able to pass through the reinforced region 15.

If the terminal length of the end section 3 of the shaft has an internal diameter which is too small to accommodate the feed eyes, this section can be lined with an anti-friction material such as polytetrafluorethylene (ptfe) and this is most easily done by winding a ptfe tape onto the shaft-forming mandrel prior to moulding the section 3.

At the tip of the shaft portion 3 (FIG. 12) there is provided an end cap 26 formed by a fixed sleeve 27 (which is a force fit on the tip of portion 3) and a replaceable line exit portion 28 (provided with a hard centre at 29) which is screw-threadedly engaged on the sleeve 27. The portion 28 may be removed, to receive an adapter piece 30 (FIG. 13), and then replaced to hold the adapter piece 30 firmly in place, as illustrated in FIG. 14. This piece 30 carries a pin 31 provided with an internal thread in which may be mounted special adaptations for the end of the rod. One such adaptation, as illustrated in FIG. 14, is a conventional quiver tip device in the form of a flexible shaft 32 having a standard threaded connector piece 33 to screw into the pin 31, and carrying conventional eyes 34 to receive the line 9.

Figure 15:
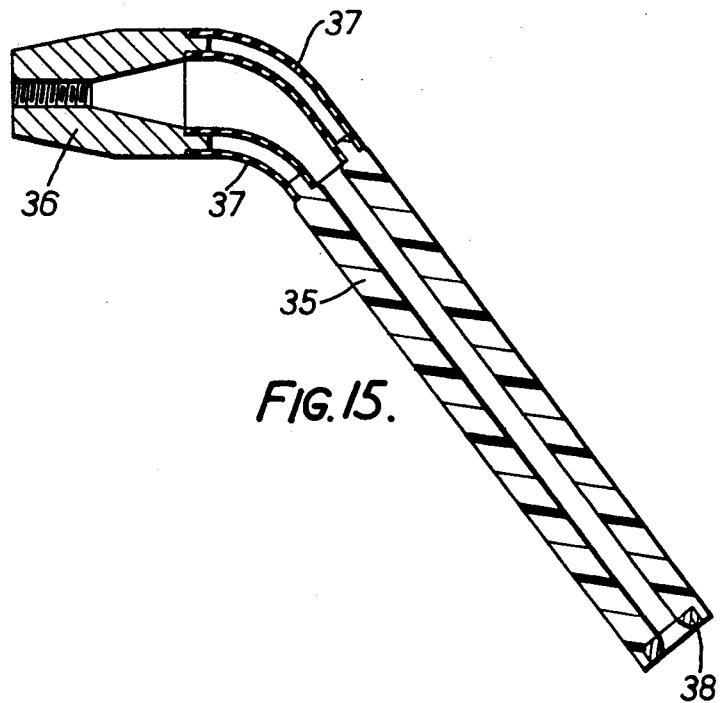
FIG. 15 shows a swing tip device which may be attached to the rod.

Another adaptation is shown in FIG. 15 and comprises a swing tip device in the form of a hollow tube 35 which is attached to a mounting piece 36 by flexible sleeves 37. In this instance, the mounting piece 36 is screwed onto sleeve 27 so as to receive the line 9. A stainless steel ring 38 at the far end of the tube 35 provides an outlet opening for the line fed through the tube. A conventional swing tip may of course be fitted to the adapter 20. The swing tip device will move in a swinging motion when a fish bites so as to provide a warning to the angler.

The rod shaft is ideally formed from glass reinforced plastics material and may be stoved to any preferred colour. Rings, such as of aluminium can be provided at junctions of the sections both for added strength and to provide an attractive appearance and the ends of the cork handle may also be provided with end caps 39.

As an aid to feeding the line through the rod shaft a line-threader, such as that illustrated in FIG. 16 may be supplied. This line-threader is in the form of a stainless steel needle 40 formed with an eye 41 to receive the line. The eye 41 is broken and bent at 42 so that the loop 43 in the line 9 can be inserted and snapped home. The line-threader is fed through the ring 7 at the end of the member 8, with the line 9 attached, and a casting action applied to the rod will cause the line-threader to travel to the tip of the rod thus carrying the line through.

The construction of the rod may be modified in various ways within the scope of the invention and in particular the eyes and lining used can be formed from any of a variety of materials demonstrating anti-friction properties other than those specifically defined. The rod shaft can be formed from any other conventional material, such as carbon fibre and other materials may be used for the line-threader.

I claim:

1. A fishing rod having a hollow shaft with a handle end and a tip end, defining an interior passageway which tapers from the handle end towards the tip end, a line entry opening to the interior of the shaft adjacent the handle end of the rod and a line exit opening from the interior of the rod adjacent the tip end of the shaft, and a series of spaced line supporting guides positioned within the shaft so than an internal passageway through each line guide is aligned with the rod axis, the internal passageway of each guide tapering inwardly, in the direction towards the tip of the rod, from the outer edge of one end of the guide towards the other end of the guide, the guides each having a length approximately 1½ times its maximum diameter, being of progressively smaller diameter towards the tip end of the rod, and being positioned along a major proportion of the length of the rod at such spacings that, when the rod is subjected to a test load, being the maximum expected working load when the rod is used for fishing, so as to take up a curved form, an imaginary straight line drawn between the points of minimum internal radius of the passageways defined by the wall sections of an adjacent pair of line guides will not contact the curved inner wall of the hollow shaft.

2. A rod according to claim 1, wherein the guides have substantially constant external cross-section throughout their length.

3. A rod according to claim 1, wherein the guides are tapered externally in the direction towards the tip of the rod.

4. A rod according to claim 3, wherein the initial portion of each guide, leading from said one end, is of substantially constant external cross-section.

5. A rod according to claim 3, wherein said other end of each guide is provided with an enlarged collar of substantially the same diameter as said one end of the guide.

6. A rod according to claim 3, wherein strengthening ribs are formed along the length of the externally tapered portion of the externally tapered guide.

7. A rod according to claim 6, wherein the strengthing ribs are set in a cruciform-shaped array.

8. A rod according to claim 1, wherein at least one end of the passageway in each guide is feathered.

9. A rod according to claim 1, wherein the passageway in each guide is of frusto-conical form.

10. A rod according to claim 1, wherein each guide incorporates a drainage slot in the side wall thereof.

11. A rod according to claim 1, wherein friction reducing means in the form of a lining of anti-friction material is provided at regions of the rod on the inner surface thereof.

12. A rod according to claim 11, wherein the anti-friction material is in the form of a spirally wound tape on the internal surface of the shaft.

13. A rod according to claim 1, including a line entry opening member recessed within the rod, and a reinforcing sleeve portion, within the shaft at the line entry opening member position.

14. A rod according to claim 13, wherein the line entry opening is formed in a moulded cartridge which slots into a recess in the rod.

15. A rod according to claim 1, wherein the tip of the shaft is provided with a mounting for attachment of an auxiliary line control device.

* * * * *